United States Patent [19]
Potter

[11] 3,842,945
[45] Oct. 22, 1974

[54] VISCOELASTIC DAMPER
[76] Inventor: James L. Potter, 108 Sherwood Dr., Edinboro, Pa. 16412
[22] Filed: June 28, 1973
[21] Appl. No.: 374,591

Related U.S. Application Data
[60] Division of Ser. No. 142,953, May 13, 1971, , which is a continuation-in-part of Ser. No. 84,003, Oct. 26, 1970, abandoned.

[52] U.S. Cl. ............... 188/1 B, 248/21, 416/107
[51] Int. Cl. .............................................. F16f 7/08
[58] Field of Search ......... 188/1 B, 1 C; 248/15, 18, 248/21, 358 R; 416/106, 107, 140

[56] References Cited
UNITED STATES PATENTS
| | | | |
|---|---|---|---|
| 1,822,026 | 9/1931 | Guy | 188/1 B UX |
| 2,494,985 | 1/1950 | Campbell | 188/1 B X |
| 3,035,799 | 5/1962 | Peirce | 248/15 |
| 3,605,953 | 9/1971 | Caldwell et al. | 188/1 B |

Primary Examiner—Duane A. Reger

[57] ABSTRACT

A viscoelastic damper particularly suited for use in a rotor system of a helicopter or the like is provided to damp lead-lag motion of the blade relative to the rotor hub. An elongate body of viscoelastic material has an inner plate embedded centrally therein and extending longitudinally thereof. Separate elongate nonextensible outer plates are secured to opposite sides of the body in spaced apart parallel relation to the inner plate. Means rigidly interconnect the outer plates for simultaneous movement relative to the inner plate and preload the body between the plate in compression. Spaced pivotal connection means are carried by the inner plate and outer plates, respectively, to effect relative movement therebetween and shearing of the body of viscoelastic material.

5 Claims, 7 Drawing Figures

PATENTED OCT 22 1974　3,842,945
SHEET 1 OF 2
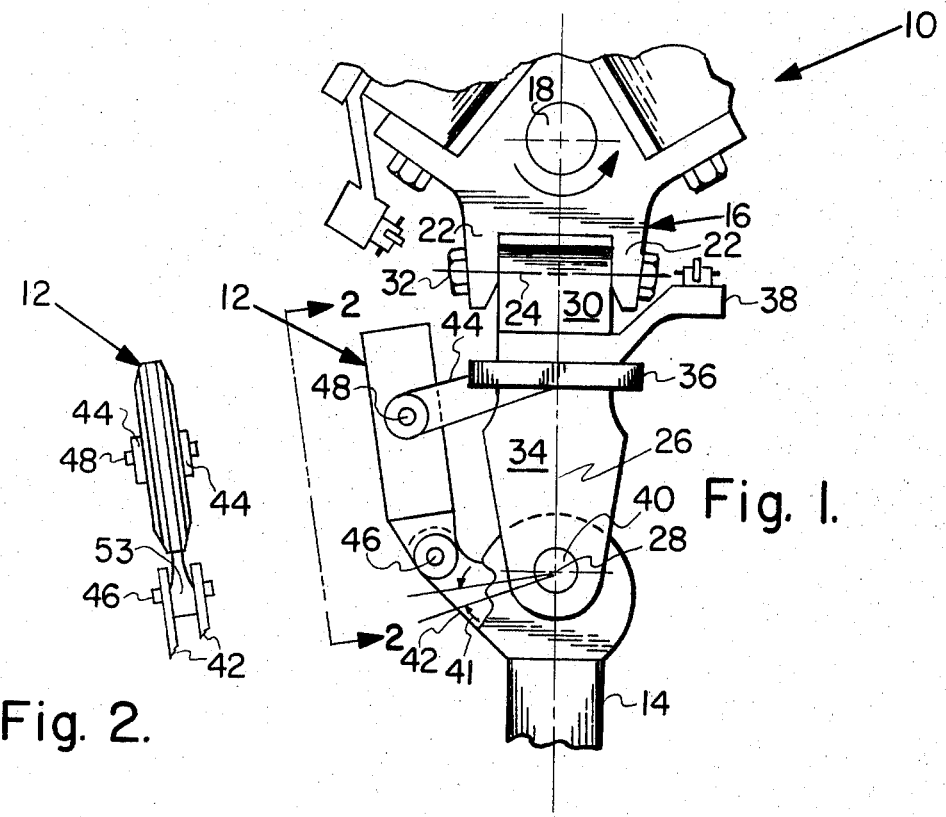
Fig. 1.
Fig. 2.
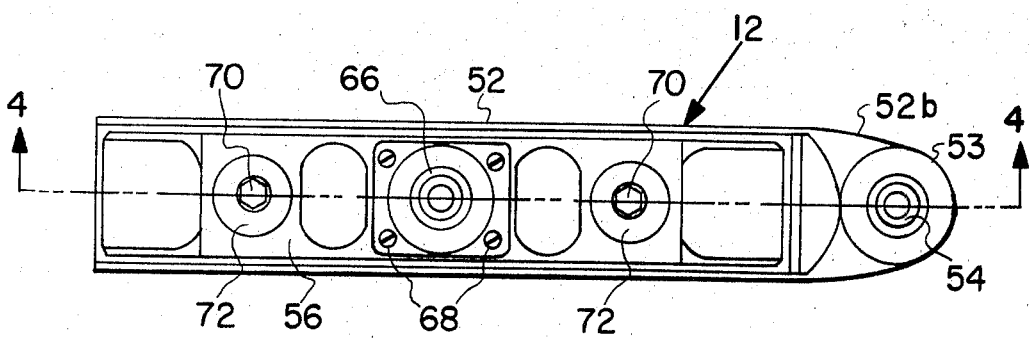
Fig. 3.
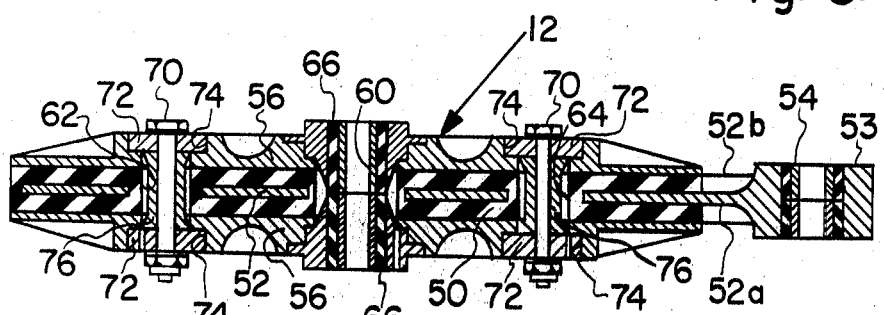
Fig. 4.

VISCOELASTIC DAMPER

This is division of U.S. Pat. application Ser. No. 142,953, filed May 13, 1971 which was a continuation-in-part of U.S. Pat. application Ser. No. 84003, filed Oct. 26, 1970 now abandoned.

This invention relates generally to a viscoelastic damper suitable for use in a rotor system of a helicopter or the like to damp lead-lag motions of the blade relative to the rotor hub.

A fundamental problem in rotor systems concerns undesirable vibrations set up by the rotor system which are transmitted to the body or fuselage of the aircraft. A primary source of these undesirable vibrations has been attributed to lead-lag or in-plane movement of the blades relative to the rotor hub during operation. In an effort to eliminate the transmission of these vibrations, various lead-lag damping mechanisms have been provided. For these mechanisms to operate most effectively, it has been common practice to pivotally mount the blades to the rotor hub via a lead-lag hinge which allows freedom of lead-lag movement of the blade. The lead-lag damper is disposed between the blade and rotor hub to damp such movement.

In addition to providing damping, a lead-lag damper must have a long service life, require a minimum of maintenance, operate in a predictable manner over a broad frequency and temperature range, not be substantially affected by environments including sand, oil, humidity, etc. Failure of the damper to have these characteristics can and normally does lead to costly aircraft downtime and repair expenses. Heretofore, lead-lag dampers have been either of the viscous (hydraulic) or friction type. While these type dampers perform satisfactorily, when operating properly, they require frequent inspection and maintenance due to their characteristic mode of operation and, thus, have a record of extensive aircraft downtime and expensive repairs.

With the above in mind, it is an object of the present invention to provide a damper suitable for use in the rotor system of a helicopter to damp lead-lag motion of the blade wherein a body of viscoelastic material is the active element.

Another object of the present invention is to provide a damper suitable for use in the rotor system of a helicopter to damp lead-lag motion of the blade wherein the active element is a body of viscoelastic material which is predominately stressed in shear.

A further object of the present invention is to provide a damper wherein the active element is a body of viscoelastic material which is predominately stressed in shear in response to relative movement and is precompressed in a direction substantially perpendicular to the direction of shear stress to increase the fatigue life thereof.

Some of the objectives of the invention having been stated, other objects will appear as the description proceeds, when taken in connection with the accompanying drawings, in which:

FIG. 1 is a schematic top plan view with parts broken away of a rotor system employing a damper of the present invention;

FIG. 2 is a schematic side elevation view taken substantially along the line 2—2 of FIG. 1;

FIG. 3 is an enlarged detail top plan view of the damper of FIG. 1;

FIG. 4 is a detail section view taken substantially along the line 4—4 of FIG. 3;

Figure 5:
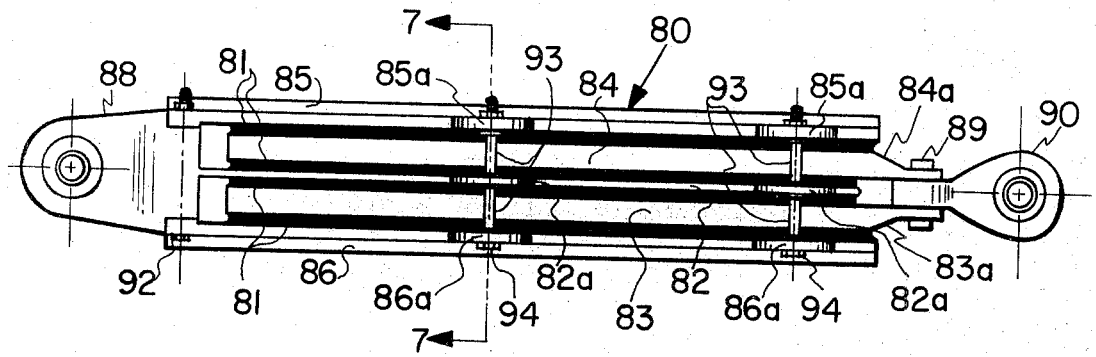
FIG. 5 is a detail top plan view of another damper of the present invention.

Referring more specifically to the drawings wherein like reference characters are used to indicate like parts, there is schematically shown in FIG. 1 a fully articulated, three blade, rotor system, generally designated at 10, having a damper 12 of the present invention operatively disposed between a sustaining blade 14 and rotor hub 16 for damping lead-lag movement of the blade 14.

As illustrated, the rotor hub 16 is carried by a rotor shaft 18 adapted, upon rotation, to rotate the rotor hub 16 about the coincident central axis of the rotor shaft 18 and rotor hub 16. At circumferentially disposed locations, the rotor hub 16 includes bifurcated portions which define pairs of spaced arms 22, only one pair of which is clearly shown.

The sustaining blades 14, one shown, are carried by the rotor hub 16 between spaced arms 22 for rotation with the rotor hub 16 during operation. The connections between a blade 14 and spaced arms 22, FIG. 1, include means supporting the blade 14 for movement about flapping, pitch and lead-lag axes, indicated at 24, 26 and 28, respectively, relative to the rotor hub 16. More particularly, a flapping hinge member 30 is pivotally disposed between spaced arms 22 by a hinge pin 32 which pin 32 defines the flapping axis 24 which extends generally perpendicular to the central axis and longitudinal axis of blade 14. Hinge pin 32 permits flapping movement of the blade 14 relative to the rotor hub 16 about the flapping axis 24. A member 34 is journaled to hinge member 30 by a pitch change bearing 36 which permits rotation of the blade 14 about the pitch axis 26 that extends generally longitudinal of blade 14 and perpendicular to the flapping axis 24. Pitch adjustment is controlled by a linkage 38 only a part of which is shown. The outboard end of member 34 is pivotally connected to the blade root or inboard end of the blade 14 by a lead-lag hinge pin 40 which defines the lead-lag axis 28. Hinge pin 40 is generally disposed parallel to the central axis and allows lead-lag movement of the blade 14 or movement of the blade generally within the plane of rotation of the rotor hub 16 relative to the rotary hub 16. While pitch movements are associated with maneuverability of the aircraft, the lead-lag and flapping movements are a result of aerodynamic effects, changes in the rate of rotating of the rotor hub 16 and the like. Typical lead-lag movements may be to oscillate hinge pin 40 through an angle 41.

The blade root or inboard end of the blade 14 adjacent the lead-lag axis 28 has a pair of space arms 42, FIGS. 1 and 2, carried thereby and extending radially outward from hinge pin 40 or the lead-lag axis 28 along an axis in a plane generally parallel to the plane of rotation of the blade 14. A pair of similarly spaced arms 44 are carried by the rotor hub 16 via the member 34 and extend outwardly therefrom along an axis in the same plane as the spaced arms 42.

By having the spaced arms 44 carried by the member 34 outboard and independently of the flapping axis 24 and pitch axis 26, the only relative movement between arms 42 and 44 will be in response to lead-lag movement of the blade 14 relative to the rotor hub 16 about the lead-lag axis 28.

As shown in FIGS. 1 and 2, the damper 12 is connected between arms 42 and 44 by hinge or pivot pins 46 and 48, respectively. With reference to FIGS. 3 and 4, the damper 12 will be described in detail. The damper 12 comprises an elongate generally rectangular body 50 of solid as contrasted to liquid viscoelastic material. As is well known and as the name implies, a viscoelastic material is a material which possesses combinations, in various proportions, of energy storage (elastic) and energy-dissipation (viscous) capabilities. Solid viscoelastic materials such as rubbers including natural rubber, silicone rubbers, urethane rubber, nitrile rubber, plasticized polyvinyl acetate, polystyrene, polyisobutylene, polyvinyl chloride, polymethyl methacrylate may be employed. However, in applicant's embodiment a silicone rubber is preferred because of their remarkable resistance to high and low temperatures and resistance to adverse effects of environments such as weathering, sand, oil, humidity and the like. For a detailed treatment of viscoelastic materials and their mode of operation, reference is made to an article by Eric E. Ungar and D. Kent Hatch, entitled "High-Damping Materials," *Product Engineering*, Volume 32, No. 16, Apr. 17, 1961 issue.

An elongate inner plate 52 of metal or other nonextensible material having a generally I-shaped cross sectional area throughout the major portion of the length thereof has the web portion 52a disposed or embedded centrally within and bonded to the body 50 of viscoelastic material and extends longitudinally thereof substantially the entire length thereof with the flange portions 52b disposed adjacent opposite sides of the body 50. One end of the inner plate 52 extends beyond the body 50 and is provided with a collar portion 53 having an elastomeric bushing 54 disposed therein extending substantially transversely of the web portion 52a of inner plate 52.

Elongate substantially identically outer plates 56 of metal or other nonextensible material are bonded to the remaining opposite sides of the body 50 of viscoelastic material substantially throughout the length thereof in spaced apart substantially parallel relation to the web portion 52a of the inner plate 52. The flange portions 52b of the inner plate 52 and outer plates 56 cooperate to substantially surround the body 50 of viscoelastic material and thus protect it from environmental effects such as weathering, sand, oil, and the like. At three substantially equally spaced locations longitudinally of the damper 12, there are transversely disposed apertures 60, 62 an 64 which respectively communicate through the body 50 of viscoelastic material, web portion 52a of inner plate 52 and outer plates 56. Aperature 60 is located at substantially the center of the body 50, inner plate 52, and outer plates 56 and thus includes the center of gravity and elastic center of the damper 12 for reasons to be hereinafter explained. Two opposed cooperating bushing members 66 are disposed in aperature 60 and are carried by outer plates 56 by screws 68, FIG. 3, which bushing members 66 provide means for connecting the outer plates 56 to the rotor hub 16. Bolts 70 having spaced washers 72 received in sockets 74 of the outer plates 56 are disposed through apertures 62 and 64 as shown, FIG. 4. Spools 76 having an outer diameter less than the diameter of aperatures 62 and 64 are carried on the bolts 70 between washers 72. As will be apparent, bolts 70 may be tightened against washers 72 to precompress the body 50 of viscoelastic material between the inner and outer plates. Precompression of the body 50 of viscoelastic material has been found to increase the fatigue life thereof and to increase the life of the bond between the various plates and the body 50 of viscoelastic material. The spools 76 serve three main functions. First, the spools 76 act as spacers between the outer plates 56 and predetermine the maximum precompression that may be imposed on the body 50 of viscoelastic material. Second, the spools 76 are designed such that the bolts are tightened until the washers 72 engage the spools 76 and thus they insure that there is a uniform predetermined precompression of the body 50 of viscoelastic material throughout the length thereof. Third, the spools 76 limit the allowable movement of the inner plate 52 relative to the outer plates 56 which if excessive in magnitude might break the bonds between the body 50 of viscoelastic material and the respective plates.

With reference back to FIGS. 1 and 2, the damper 12 is operatively disposed between the blade 14 and rotor hub 16 by having the collar 53 of the inner plate 52 positioned between arms 42 and pivotally secured there by the hinge or pivot pin 46 being received through bushing 54. The major portion of the damper 12 is pivotally secured between arms 44 by the hinge or pivot pin 48 being received through bushing 66. Thus, the body 50 of viscoelastic material is disposed adjacent and apart from the means connecting the blade 14 to the rotor hub 16 with the longitudinal axis thereof and of the inner plate and outer plates extending generally parallel thereto within a plane generally parallel to the plane of rotation of the rotor hub 16. Due to the construction previously described, the inner plate 52 is subject to movement relative to the outer plates 56 and rotor hub 16 in accordance with the lead-lag movement of the blade 14. During lead-lag movement of the blade 14 relative to the rotor hub 16, the hinge or pivot pin 46 will oscillate to approach and recede from hinge or pivot pin 46 to move inner plate 52 substantially along the longitudinal axis thereof to predominately and uniformly shear the body 50 of viscoelastic material throughout the length thereof between the inner plate 52 and outer plates 56. The precompression of the body 50 of viscoelastic material while not materially affecting the damping qualities thereof acts to increase its fatigue life. Furthermore, by connecting the outer plates 56 to the rotor hub 16 at substantially the center of gravity and elastic center of the damper 12, improved stability of the damper 12 is provided and the weight thereof is primarily carried by the rotor hub 16 and not the blade 14.

Figure 6:
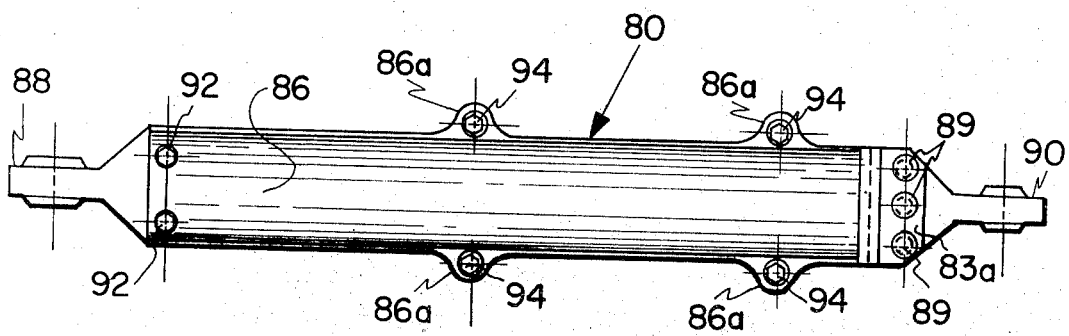
FIG. 6 is a detail side elevation view of the damper of FIG. 5.
Figure 7:
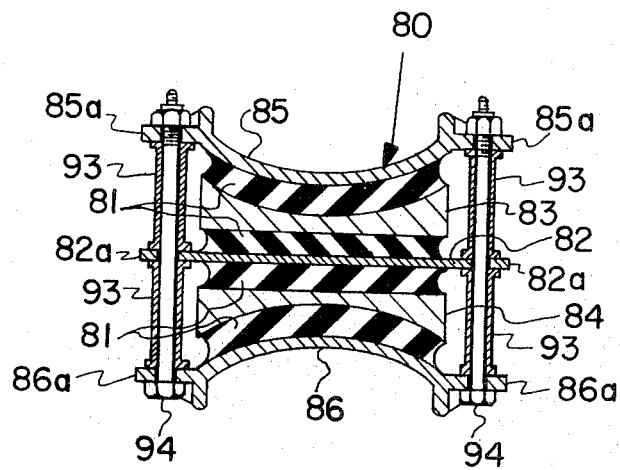
FIG. 7 is an enlarged sectional view taken substantially along the line 7—7 of FIG. 5.

In the use of a lead-lag damper in a helicopter, it is oftentimes desirable for various reasons for the pivotal connections to be made at opposite ends of the damper. When a lead-lag damper of the present invention is to be so connected between the blade and rotor hub and depending on the length thereof, internal stability or tendency of the viscoelastic material not to be sheared longitudinally of the damper in response to lead-lag motions of the blade becomes a problem which must be overcome. With reference to FIGS. 5–7, there is shown an embodiment of a damper 80 of the present invention including means by which stability is effectively maintained. Furthermore, the damper 80 illustrates one means by which the amount of damping obtained can be increased without increasing the length thereof.

The damper 80 comprises an elongate body of viscoelastic material divided into four sections 81 by five elongate spaced apart parallel superimposed nonextensible plates 82, 83, 84, 85 and 86 with the sections 81 of viscoelastic material bonded between adjacent plates. As will be noted, each of the plates 82–86 are of generally uniform length with the sections 81 of viscoelastic material extending longitudinally therebetween substantially their entire length. The central plate 82 is planar and extends outwardly beyond one end of the body of viscoelastic material and has tabs 82a spaced longitudinally thereof extending outwardly beyond opposite sides of the body of viscoelastic material. The portion of central plate 82 extending outwardly beyond the one end is fixedly connected to pivotal connection means 88. In the present design, pivotal connection means 88 and central plate 82 are an integral structure. Intermediate plates 83 and 84 have planar surfaces facing toward central plate 82 and transverse concave surfaces facing away from central plate 82. Portions 83a and 84a of intermediate plates 83 and 84 extend outwardly beyond the other end of the body of viscoelastic material, the end remote from pivotal connection means 88. Portions 83a and 84a are interconnected by rivet 89 to pivotal connection means 90 for simultaneous longitudinal movement. Outer plates 85 and 86 have mating transverse convex surfaces facing inwardly toward the concave surfaces of intermediate plates 83 and 84 and include longitudinally spaced tabs 85 and 86, respectively, which project outwardly beyond opposite sides of the body of viscoelastic material in parallel spaced apart relation to tabs 82a of central plate 82. The central plate 82 and outer plates 85 and 86 are interconnected for simultaneous longitudinal movement in such a manner as to precompress the body of viscoelastic material for reasons previously explained. This precompression is accomplished by prefabricating the body of viscoelastic material and bonding the sections 81 between adjacent plates prior to interconnection of the plates. The thickness of the sections 81 in the prefabricated structure should be greater than desired after interconnection such that upon interconnection, as to be described, the desired amount of precompression is obtained. The central plate 82 and outer plates 85 and 86 are rigidly interconnected at three longitudinally spaced locations. By interconnecting at spaced locations, uniform precompression of the body of viscoelastic material is obtained longitudinally thereof. At one end the outer plates 85 and 86 are fixedly connected to pivotal connection means 88 which is in turn connected to central plate 82 in predetermined spaced apart relation by nut and bolt assembly 92. The plates 82, 85 and 86 are fixedly interconnected at a point intermediate opposite ends and adjacent the other end by spacer spools 93 of uniform predetermined length disposed between cooperating tabs 82a and 85a and 86a, respectively, and nut and bolt assemblies 94 (FIG. 7). The resulting predetermined spacing of outer plates 85 and 86 relative to central plate 82 establishes the precompression of the sections 81 of viscoelastic material.

In use of the damper 80 in a helicopter, it is interconnected between the blade and rotor hub in a manner similar to damper 12, previously described, such that lead-lag motion of the blade relative to the rotor hub will cause relative movement between the intermediate plates 83 and 84 and central and outer plates 82, 85 and 86 longitudinally of the damper 80. Such relative movement causes shearing of the sections 81 of viscoelastic material to dampen such motions. Stability is maintained by cooperation of the intermediate plates 83 and 84 with the outer plates 85 and 86. That is, forces tending to move the outer plates 85 and 86 transversely of the damper 80 relative to the intermediate plates 83 and 84 or vice versa will be limited by the resistance of the sections 81 of viscoelastic material since such movement loads the viscoelastic material in compression as compared to shear. In comparison of the damper 80 with damper 12, it will be apparent that intermediate plates 83 and 84 are equivalent to inner plate 52 and the central and outer plates 82, 85 and 86 are equivalent to outer plates 56.

Dampers 12 and 80 have illustrated two and four sections of viscoelastic material for damping relative motions. Any number of sections can be employed depending on the damping desired. Also, the dampers 12 and 80 are constructed and operate so that damping is provided predominately by shear of the viscoelastic material. While the magnitude of damping for a given viscoelastic material is normally greatest when subjected to shear, the body of viscoelastic material may also be subjected to tension, compression and combinations of shear, tension and/or compression and still be effective as a damping medium in accordance with the present invention. By utilizing a solid body of viscoelastic material as the active element in a damper, maintenance problems have been substantially reduced. It will be apparent that the damper of the present invention while being particularly suited for use in the rotor system of a helicopter to damp lead-lag motions of the blade may be used in many other applications.

In the drawing and specification, there has been set forth preferred embodiments of the invention, and although specific terms are employed, they are used in a generic and descriptive sense only and not for purposes of limitation.

What is claimed is:

1. A viscoelastic damper comprising an elongate body of viscoelastic material, an elongate nonextensible inner plate embedded centrally within and bonded to said body and extending longitudinally thereof substantially the entire length thereof, said inner plate having one end extending outwardly beyond said body, pivotal connection means carried by said one end of said inner plate, separate elongate nonextensible outer plates bonded to opposite sides of said body substantially the entire length thereof in spaced apart parallel relation to each other and to said inner plate, the elongate axis of said plates being oriented in the same direction as that of said body, means rigidly interconnecting said outer plates for simultaneous movement relative to said inner plate and preloading said body between said inner and outer plates in compression perpendicular to its longitudinal axis, said outer plate interconnecting means being spaced from said body and inner plate means, and pivotal connection means carried by said outer plates, the axis of each of said pivotal connection means being perpendicular to the longitudinal axis of said damper.

2. A viscoelastic damper, as set forth in claim 1, wherein said outer plates rigid interconnecting means comprises rigid spacer means disposed between said outer plates in spaced relation from said body and inner plate means, and means rigidly interconnecting said outer plates with said spacer means for preloading said body between said inner and outer plates in compression.

3. A viscoelastic damper, as set forth in claim 1, wherein said outer plates pivotal connection means is carried substantially half way between opposite ends of said outer plates.

4. A viscoelastic damper, as set forth in claim 2, wherein said inner plate and at least one of said outer plates have proximate mating convex and concave surfaces extending transversely thereof to resist relative transverse movement between said inner plate and at least one outer plate.

5. A viscoelastic damper, as set forth in claim 4, wherein said outer plates pivotal connection means is carried by the end of said outer plates remote from said inner plate pivotal connection means.

* * * * *